(12) United States Patent
Yu et al.

(10) Patent No.: US 11,741,984 B2
(45) Date of Patent: Aug. 29, 2023

(54) METHOD AND APPARATUS AND TELEPHONIC SYSTEM FOR ACOUSTIC SCENE CONVERSION

(71) Applicant: ACADEMIA SINICA, Taipei (TW)

(72) Inventors: Tsao Yu, Taipei (TW); Syu-Siang Wang, Taipei (TW); Szu-Wei Fu, Keelung (TW); Alexander Chao-Fu Kang, Taipei (TW); Hsin-Min Wang, New Taipei (TW)

(73) Assignee: ACADEMIA SINICA, Taipei (TW)

( * ) Notice: Subject to any disclaimer, the term of this patent is extended or adjusted under 35 U.S.C. 154(b) by 38 days.

(21) Appl. No.: 17/335,487

(22) Filed: Jun. 1, 2021

(65) Prior Publication Data

US 2021/0390971 A1 Dec. 16, 2021

Related U.S. Application Data

(60) Provisional application No. 63/038,241, filed on Jun. 12, 2020.

(51) Int. Cl.
*G10L 21/0272* (2013.01)
*G10L 25/48* (2013.01)
*G10L 15/20* (2006.01)

(52) U.S. Cl.
CPC .......... *G10L 21/0272* (2013.01); *G10L 15/20* (2013.01); *G10L 25/48* (2013.01)

(58) Field of Classification Search
CPC ............................ G10L 21/0272; G10L 25/48
See application file for complete search history.

(56) References Cited

U.S. PATENT DOCUMENTS

| | | | |
|---|---|---|---|
| 9,699,288 B1* | 7/2017 | Chien | G10L 21/003 |
| 2008/0300871 A1* | 12/2008 | Gilbert | G10L 15/30 |
| | | | 704/E15.001 |
| 2014/0379164 A1* | 12/2014 | Joh | G01C 21/30 |
| | | | 701/1 |
| 2015/0005911 A1* | 1/2015 | Lake, II | A63B 71/06 |
| | | | 700/91 |
| 2017/0039865 A1* | 2/2017 | Takabayashi | G08G 9/02 |
| 2020/0104670 A1* | 4/2020 | Seo | G06V 40/174 |
| 2020/0204854 A1* | 6/2020 | Song | G06F 3/165 |
| 2021/0110821 A1* | 4/2021 | Lim | G10L 21/0232 |
| 2021/0174820 A1* | 6/2021 | Sugiyama | G10L 21/02 |

FOREIGN PATENT DOCUMENTS

| | | |
|---|---|---|
| CN | 102810316 B | 9/2014 |
| CN | 111243620 A | 6/2020 |

OTHER PUBLICATIONS

Yu-Hsien Wang, N., Wang, H. L. S., Wang, T. W., Fu, S. W., Lu, X., Tsao, Y., & Wang, H. M. (2019). Improving the Intelligibility of Electric and Acoustic Stimulation Speech Using Fully Convolutional Networks Based Speech Enhancement. arXiv e-prints, arXiv-1909.*

Park, S. R., & Lee, J. (2016). A fully convolutional neural network for speech enhancement. arXiv preprint arXiv: 1609.07132.*

* cited by examiner

*Primary Examiner* — Bryan S Blankenagel
(74) *Attorney, Agent, or Firm* — WPAT, P.C

(57) ABSTRACT

An acoustic scene conversion method, comprising: receiving sound signals including user's speech and scenic sounds; processing the sound signals according to an artificial intelligence model to generate enhanced speech signals without scenic sounds; and mixing the enhanced speech signals with new scenic sounds to produce converted sound signals.

10 Claims, 3 Drawing Sheets

METHOD AND APPARATUS AND TELEPHONIC SYSTEM FOR ACOUSTIC SCENE CONVERSION

CROSS REFERENCE TO RELATED PATENT APPLICATION

This patent application claims benefits of U.S. provisional patent application No. 63/038,241 filed on Jun. 12, 2020.

FIELD OF THE INVENTION

The present invention relates to signal processing, and more particularly, to processing of scenic sound.

BACKGROUND OF THE INVENTION

Mobile phones are daily telecommunication tools in modern era. People use mobile phones in various kinds of places. Hence, people in the remote ends listen to background sounds of these places, e.g., horns on streets, peddling in markets, dancing music in ball rooms, wind blowing and rain dropping outdoor. The background sounds may not be pleasant, or they may leak their locations, people do not want these scenic sounds being transmitted to the remote ends.

Telephonic salesmen and customer servicers also try to improve clients' experience. They do not want their clients listening to noisy background but pleasant background music. Besides, following the "work from home" trend, users do not want their colleagues or customers hearing background sounds of house which may leak privacy. Hence, in order to solve the abovementioned problem, apparatus and method for preventing scenic sounds propagating to remote ends and replacing them with other scenic sounds while keeping or even enhancing voice are desired.

SUMMARY OF THE INVENTION

According to an embodiment of the present invention, an acoustic scene conversion method is provided. The acoustic scene conversion method, comprising: receiving sound signals including user's voice sounds and scenic sounds; processing the sound signals according to an AI model in order to generate enhanced voice sounds without scenic sounds; and mixing the enhanced voice sounds without scenic sounds with new scenic sounds in order to generate converted sound signals.

According to an embodiment of the present invention, an acoustic scene conversion apparatus is provided. The acoustic scene conversion apparatus, comprising: a microphone, configured for receiving sound signals including user's voice sounds and scenic sounds; and a processor unit, coupled to the microphone, configured to execute multiple instructions stored in non-volatile memory to realize the following steps: processing the sound signals according to an AI model in order to generate enhanced voice sounds without scenic sounds; and mixing the enhanced voice sounds without scenic sounds with new scenic sounds in order to generate converted sound signals.

According to an embodiment of the present invention, a telephonic system for acoustic scene conversion is provided. The telephonic system for acoustic scene conversion comprising: a network, and a first apparatus and a second apparatus connecting to the network. The first apparatus further comprising: a first network interface, configured to connect to the network; a microphone, configured for receiving sound signals including user's voice sounds and scenic sounds; and a first processor unit, coupled to the first network interface and the microphone, configured to execute multiple instructions stored in non-volatile memory to realize the following steps: processing the sound signals according to an AI model in order to generate enhanced voice sounds without scenic sounds; mixing the enhanced voice sounds without scenic sounds with new scenic sounds in order to generate converted sound signals; and transmitting the converted sound signals to a remote apparatus for playing via the network through the network interface in real time. The second apparatus comprising: a second network interface, configured to connect to the network; a speaker; and a second processor unit, coupled to the second network interface and the speaker, configured to execute multiple instructions stored in non-volatile memory to realize the following steps: receiving the converted sound signals via the second network interface; and having the speaker for playing the converted sound signals.

The acoustic scene method, apparatus and telephonic system provided by the present invention can prevent actual scenic sounds from propagating to a remote end and can replace it with other scenic sounds while preserving or even enhancing voice sounds.

BRIEF DESCRIPTION OF THE DRAWINGS

The advantages and spirit related to the present invention can be further understood via the following detailed description and drawings.

DETAILED DESCRIPTION OF THE PREFERRED EMBODIMENT

Figure 1:
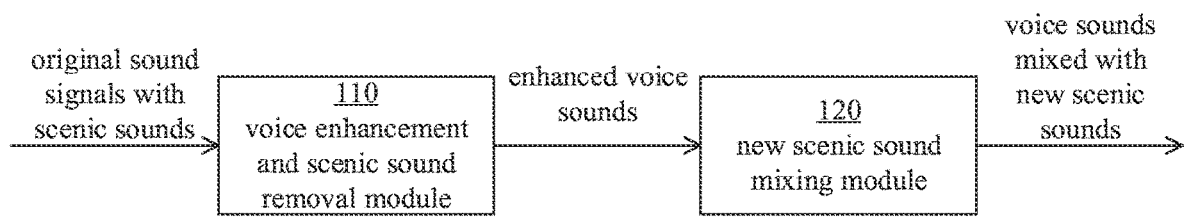
FIG. 1 shows a block diagram of acoustic scene conversion according to an embodiment of the present invention.

Some embodiments of the present application are described in details below. However, in addition to the description given below, the present invention can be applicable to other embodiments, and the scope of the present invention is not limited by such rather by the scope of the claims. Moreover, for better understanding and clarity of the description, some components in the drawings may not necessary be drawn to scale, in which some may be exaggerated related to others, and irrelevant. If no relation of two steps is described, their execution order is not bound by the sequence as shown in the flowchart diagram.

Traditionally, sound signal processing requires recording studio and many apparatuses in order to generate high quality sound signals. Computing power provided by mobile phones is quantum leaped so as it can be utilized to filter background sound out and to reserve voice without recording studio and its equipment. In addition, the voice is further mixed with background sounds such as music. And the mixed sound can be transmitted via telecommunication networks in real time. Meanwhile, existing echo cancellation function would not be interfered.

In order to fulfill the abovementioned function, software or application can be installed in mobile phone to achieve acoustic scene conversion. The conversion of acoustic scene may be divided into two phases. The first phase is to enhance voice. By eliminating scenic sound in real time, the voice can be enhanced according to trained artificial intelligence model. The second phase is to mix new scenic sounds. The enhanced voice and new scenic sounds are mixed and transmitted to a remote end. The mixing can be done by software, hardware or digital mixer provided by the mobile phone.

Since there is no standard method to evaluate the effects of acoustic scene conversion, people participating voice communication may give their grades on the effects. With regard to the first phase, there are existing tools such as PESQ, STOI for evaluations.

Following paragraphs introduce how the acoustic scene conversion works and the structure of the artificial intelligence models. The characteristics of the acoustic scene conversion include following three points: 1. configurable environment, 2. advanced scenic sound removal technique, and 3. mixing of new scenic sound.

Configurable Environment

In order to provide accurate acoustic scene conversion function, configurable information may be provided before the conversion. For example, the information may include one or any combination of following items: speaker gender, age, scene and scenic noise. The mechanism provided by the present invention can select de-noise mode according to the abovementioned information to adopt different environmental situations.

A single trained AI model may not fit various different acoustic scenes. Hence, in a preferred embodiment, many AI models trained with respect to different environments are provided. Samples used in the training processes of these AI models are corresponding to the information. For example, samples of senior females in markets and samples of young males on streets may be provided for different AI models, respectively.

In one embodiment, the mechanism provided by the present invention facilitates that the user can set up the information before the conversion. In some examples, after the acoustic scene conversion application is launched, the information can be inputted by the user. Therefore, according to the parameters inputted by the user, corresponding AI model is loaded consequently. In another example, the information may be predetermined. When the user installs or configure system of the mobile phone, the birthday and the gender of the user can be set up. The mechanism provided by the present invention may retrieve the user configuration information from the system of the mobile system to aware the age and the gender of the user. It does not bother the user to input the information each time launching the application.

In one embodiment, the information may be determined dynamically. For example, positioning function provided by the mobile phone may be utilized to determine the scene where the mobile phone locates automatically. In an example, the mobile phone may determine that itself is located outdoor based on satellite positioning system. Furthermore, according to the measured moving speed, it may determine that itself is onboard a car. The mechanism provided by the present invention may use the automatic determination function to choose corresponding AI model.

In another example, the mechanism provided by the present invention may collect background or scenic sounds by the mobile phone before initializing the voice communication. Subsequently, the mobile phone itself may determine which AI model is the most appropriated according to the collected background or scenic sounds. Or, the collected background or scenic sounds may be transmitted to a remote scenic determination server in real time. Based on the determination result generated by the mobile phone itself or the remote server, corresponding AI model may be loaded accordingly.

In other words, the present invention may determine which AI model is applied based on predetermined input information and/or dynamically determined information. Besides, the AI model may be chosen based on more than one kind of information in accordance with the present invention. For example, positional information and speed information gathered from the positioning function and scenic sounds determination result before or during the communication may be collectively used to determine the applicable AI model. In an embodiment, the AI model can be dynamically chosen, i.e., two or more AI models are applied during an acoustic scene conversion process.

In one embodiment, multiple AI models are stored in the mobile phone. Alternatively, the AI model may be dynamically downloaded to the mobile phone. For example, when the remote scenic sounds determination server determines the scenic sounds information, the corresponding AI model may be pushed to the mobile phone for further utilization.

Advanced Scenic Sound Removal Technique

The scenic sound removal technique provided by the present invention is applicable to the mobile phone. It can distinguish voice sounds and scenic sounds and remove the scenic sounds in real time. In one embodiment of the present invention, the aforementioned AI model is used to remove scenic sounds in real time. The AI model may be a FCN (fully convolutional neural network.) It does not require any pre-process. The original sound signals can be directly inputted. Since the utilization of FCN can prevent pre-process of the original sound signals, it ensures that the scenic sounds can be removed in real time. Voice sounds can be left or separated.

In other embodiments, other kinds of neural networks, deep neural networks or mathematical regression models may be used by the present invention to remove the scenic sounds in real time. In case it is not required to pre-process the original sound signals or the processing is fast enough to meet real time criteria, the present invention does not limit that the AI model should be a FCN. Person having ordinary skill in the art can understand that the AI models referred by the present invention can be any algorithm satisfies the aforementioned conditions. They may comprise neural network, deep neural networks or specified mathematical algorithms.

In one embodiment, more than more AI models are used to enhance voice sounds and to move scenic sounds, respectively. For example, a first AI model is used to remove scenic sounds. The output is further processed by a second AI model to enhance voice sounds. Alternatively, in another embodiment, the second AI model is applied to enhance voice sounds at first. The output is further processed by a first AI model to remove scenic sounds.

In one embodiment, the mobile phone may equip with multiple microphones or transducers. A first microphone near user's mouth is configured to receive user's voice input. A second microphone far from user's mouth is configured to receive background scenic sounds. Differences between these two sound signals concurrently received by the first and the second microphones are viewed as user's voice sounds. Furthermore, results of sound signals of the first microphone subtract the voice sounds are taken as background scenic sounds. In this embodiment, in order to further enhance voice sounds and remove scenic sounds, AI models, neural networks, deep neural networks or mathematical regression models may be further applied to the differences between these two sound signals in order to remove scenic sounds more throughthout.

Mixing New Scenic Sounds

Since the sound signals are sampled in digital form, digital mixer implemented by software or hardware may be used to mix the remained voice sounds and new scenic sounds to generate acoustic scene converted sound signals. Through the digital mixer, the sound signals may be modulated in a transmission format compatible to telecommunication standards or proprietary standards. For examples, the formats may be 128 kb/s, 64 kb/s or 16 kb/s fixed data rate or non-fixed data rate for transmissions to remote end.

In one embodiment, in order to alleviate incompleteness removal of scenic sounds, volume of original scenic sounds may be turned low and new scenic sounds may be turned up such that the listener in the remote end can barely listen to the original scenic sounds and can mostly hear the new scenic sounds.

In order to make sure that the acoustic scene conversion can be done in real time, hardware equipped in the mobile phone may be used to accelerate process. For example, GPU (graphics processing unit) or AI co-processor equipped in the mobile phone may have scalar processing units or other kinds of acceleration of arithmetic and logic processing units (ALU) and their array. The present invention may use these specified hardware to realize the real time process of the aforementioned scenic sound removal and mixing functions.

Please refer to FIG. 1, which shows a block diagram of acoustic scene conversion according to an embodiment of the present invention. The embodiment includes two modules. The first one is voice enhancement and scenic sound removal module 110. The second one is new scenic sound mixing module 120. In this block diagram, a user at a first communication end talk in a noisy environment. Original sound signals with scenic sounds are inputted into the voice enhancement and scenic sound removal module 110 in real time. The voice enhancement and scenic sound removal module 110 may select one or more AI models based on predetermined or dynamically determined information for removing background noises or so-called scenic sounds in the original sound signals and saving enhanced and clear user's voice signals.

Next, new scenic sound mixing module 120 is configured to mix enhanced voice signals with new scenic sounds to generated sound signals which is mixed with new scenic sounds. The user can specify the new scenic sounds being mixed. The acoustic scene converted sound signals at the first communication end can be transmitted to another second communication end via telecommunication network in real time. The second communication end may use the same acoustic scene conversion technique to transmit converted sound signals back to the first communication end.

Figure 2:
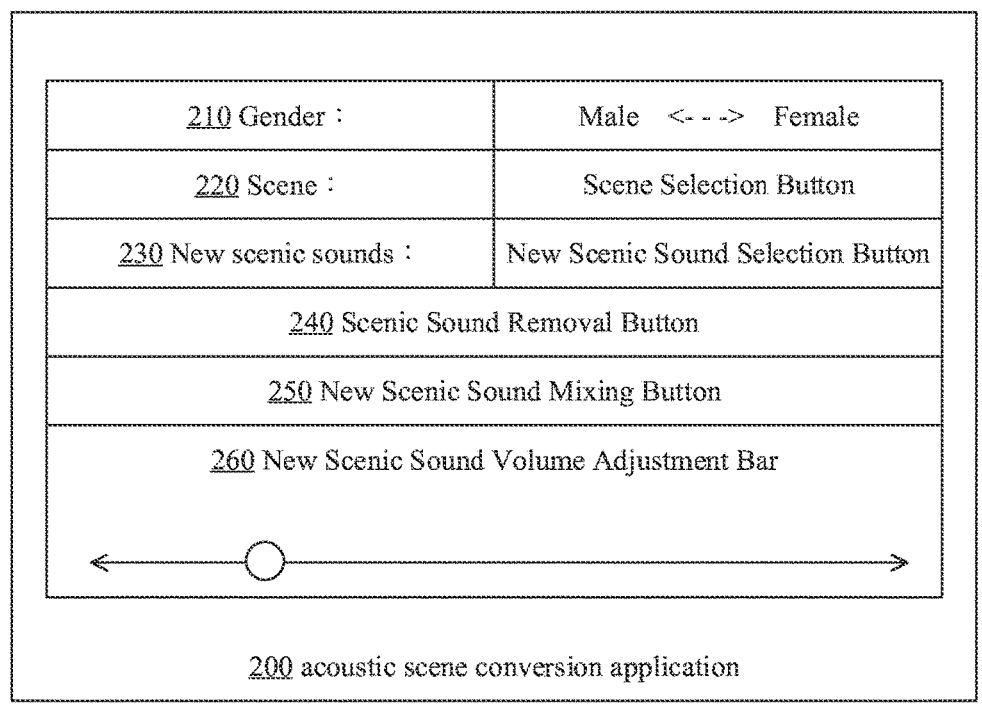
FIG. 2 illustrates a display window of an acoustic scene conversion in accordance with an embodiment of the present invention.

Please refer to FIG. 2, which illustrates a display window of an acoustic scene conversion in accordance with an embodiment of the present invention. The acoustic scene conversion application 200 may be configured to test the two phases of the acoustic scene conversion, respectively. The application 200 may be installed in a mobile phone. In the display window as shown in FIG. 2, several items may be inputted by user. In order to more precisely retrieving voice sounds, a gender selection 210 is used to specify user's gender, male or female. Although the gender selection 210 only shows two options including male or female, a third option, child, may be included in accordance with an embodiment of the present invention, since user's gender and/or age is decisive for his/her voice. In order to specify the acoustic scene, the scene selection 220 includes a scene selection button. In other embodiments, the scene selection 220 may include an AI model selection button. After the button is pressed, a dialog window of the application would be popped up for displaying of available scenes, i.e., AI models trained according to the scenes. After one of the available scenes is selected, name of the selected scene would be displayed on the window. A new scene selection 230 as shown in FIG. 2 includes a new scene selection button. After the button is pressed, a dialog window of the application would be popped up for displaying of available acoustic scenes. Although the embodiment as shown in FIG. 2 shows three selection inputs, it is already discussed that predetermined setting values may be used as default values so as it may free the user from inputting his/her selections each time. The inputs may be automatically filled according to dynamic recognitions.

The gender selection 210 and the acoustic scene selection 220 are configured to help the voice enhancement and scenic sound removal module 110 to select AI model. In one embodiment, the user can directly select the AI model to be used. Some AI models may be trained with regard to a specified person to order to improve voice enhancement, For example, the user may be invited to record sound signals at places where the user usually talks to the mobile phone. The recorded sound signals are used to train AI models specifically adapted to the user.

In one embodiment, the application can automatically determine the gender and/or the age of the user according to the voice in order to automatically adjust the AI model to be applied. Already discussed, the application may determine the AI model to be applied based on the background scenic sounds before the communication is initialized. The determination may be done by the mobile phone itself or a remote scenic sounds determination server. Suitable AI models may be downloaded to the mobile phone remotely according to the determination result.

In one embodiment, the application may automatically select new scenic sounds and/or adjust parameters of mixer according to characteristic values of the voice sounds. For example, the application may detect characteristic values such as voice speed, tone and volume for references. When one or more characteristic values changes, tone or volume of the new scenic sounds may be adjusted accordingly, even a new scenic sound may be selected. In another embodiment, the application may select new scenic sounds or adjust parameters of mixer according to the removed scenic sounds. For example, when tone or volumes of the removed scenic sounds changes, tone or volume of the new scenic sounds may be adjusted accordingly, even a new scenic sound may be selected. In short, the application may automatic adjust parameters or material of the mixer according to one or more characteristic values of the received sound signals.

The acoustic scene conversion application 200 as shown in FIG. 2 further comprises a scenic sound removal button 240, a new scenic sound mixing button 250 and an adjustment bar of new scenic sound volume 260. The scenic sound removal button 240 is a switch for the first phase of conversion. When the scenic sound removal button 240 is pressed by the user, the application starts the work of scenic sound removal and voice enhancement. The user may test sound signals piece by piece. Next, after setting the adjustment bar of new scenic sound volume 260, the new scenic sound mixing button 250 may be pressed by the user. Thus, the application would mix the enhanced voice sounds with the selected new scenic sounds according to the set volume.

Although only three input information of the acoustic scene conversion application are shown in FIG. 2, more information may be inputted to the application when more training samples corresponding to more training conditions are provided for more available AI models. Person having ordinary skill in the art can understand how to train various AI models according to various sets of training samples corresponding to different training conditions.

In one embodiment, an application configured for voice communication does not need the scenic sound removal button 240 and the new scenic sound mixing button 250 as shown in FIG. 2. Before the voice communication is established, e.g., before requesting the voice communication or accepting the request of voice communication, the user may setup the information to the application via user interface components such as the gender selection 210, the scene selection 220, new scene selection 230 and the adjustment bar of new scenic sound volume 260. In another embodiment, the application configured for voice communication does not need any one-time information but default values. In an alternative embodiment, the application configured for voice communication may automatically and dynamically setup the information.

Figure 3:
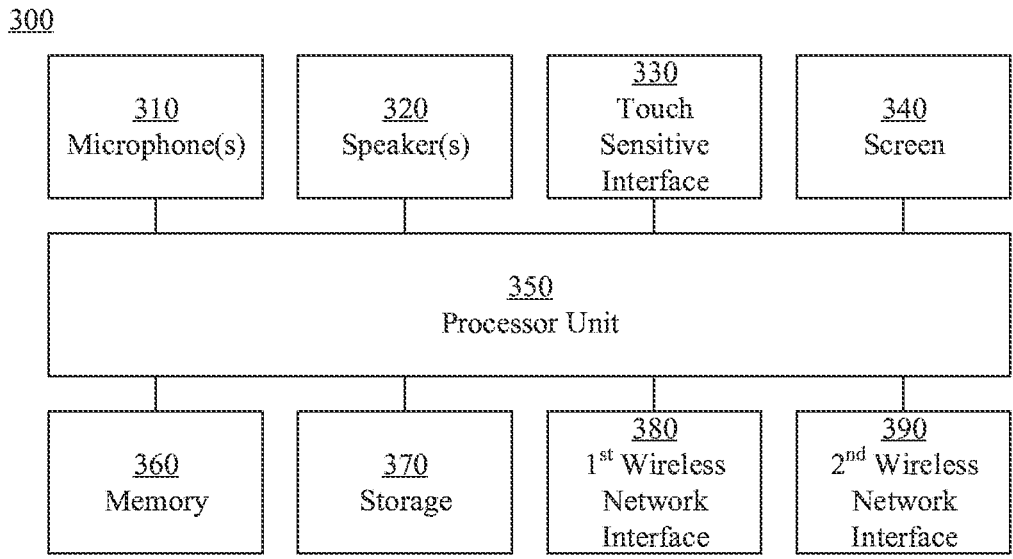
FIG. 3 depicts a block diagram of a mobile phone apparatus according to an embodiment of the present invention.

Please refer to FIG. 3, which depicts a block diagram of a mobile phone apparatus 300 according to an embodiment of the present invention. The mobile phone apparatus 300 may be configured to implement the acoustic scene conversion method provided by the present invention, for example, to realize the aforementioned acoustic scene conversion application. The mobile phone apparatus 300 may comprise one or more microphones 310, one or more speakers 320, a touch sensitive interface 330, a screen 340, a processor unit 350, a memory module 360, a storage module 370, a first wireless network interface 380 and a second wireless network interface 390. The processor unit 350 may execute an operating system for controlling all components as shown in FIG. 3.

The application configured for realizing the acoustic scene conversion method may be run in the environment provided by the operating system. For example, the application may be the acoustic scene conversion application 200 or one of it variants. The application may take the microphone 310 as an input device and take the speaker 320 as an output device. The application can be shown in the screen 340 and receive user's input via the touch sensitive interface 330 placed on the screen 340 or independently instituted touch sensitive interface 330. In one embodiment, sound signals outputted by the application (e.g., the acoustic scene conversion application 200 as shown in FIG. 2,) may be replayed by the speaker 320. In another embodiment, the sound signals outputted by the application may be transmitted to another mobile phone apparatus 300 via the first wireless network interface 380 or the second wireless network interface 390 for remotely playing by the speaker 320 of the another mobile phone apparatus 300.

The first wireless network interface 380 may be a wireless network interface compliant to the $3^{rd}$, $4^{th}$, $5^{th}$ generation mobile communication standards or any other wide area wireless network standards. The second wireless network interface 390 may be a wireless local area network interface. In one embodiment, the mobile phone apparatus 300 may comprise additional wired network interface which is not shown in FIG. 3. No matter the network interface is corded or cordless, the mobile phone apparatus 300 may transmit sound signals to a remote end via the network interface. Besides, the mobile phone apparatus 300 may further comprise satellite positioning system for gathering its own position, or from the mobile telecommunication system connected by the first wireless network interface 380 or from the wireless local area network connected by the second wireless network interface 390.

Figure 4:
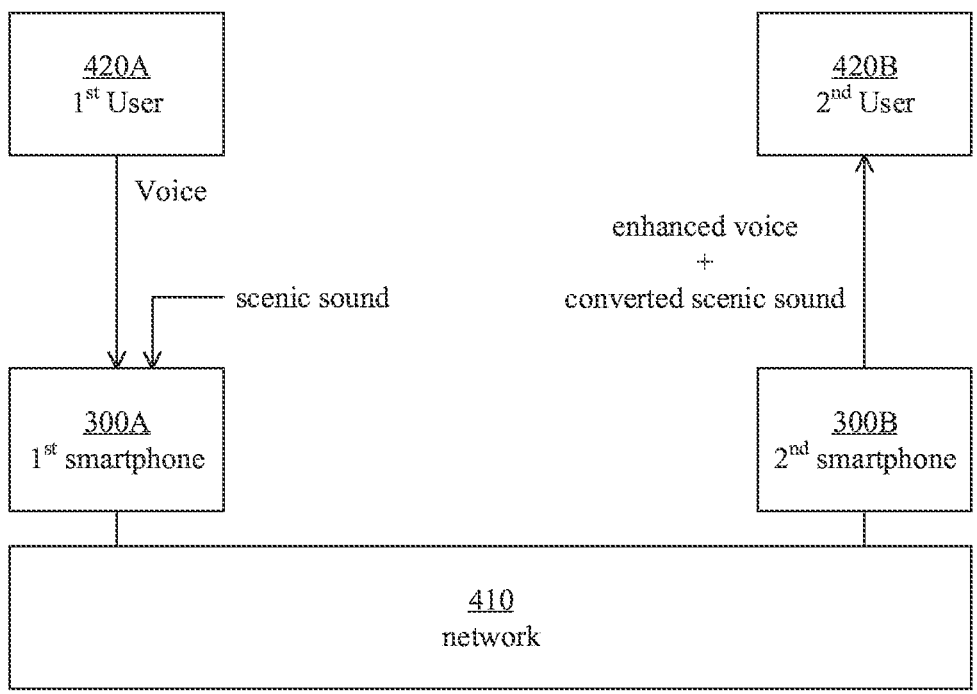
FIG. 4 shows a block diagram of telephonic voice transmission in accordance with an embodiment of the present invention.

Please refer to FIG. 4, which shows a block diagram of telephonic voice transmission in accordance with an embodiment of the present invention. The telephonic system 400 comprises a network 410, e.g., which is compliant to the $3^{rd}$, $4^{th}$, $5^{th}$ generation mobile communication standards or any other wireless network standards, connects to a first mobile phone apparatus 300A and a second mobile phone apparatus via the first wireless network interface 380 or the second wireless network interface 390. The network 410 may be circuit switched network or packet switched network. It can be either public network or private network.

When a first user 420A of the first mobile phone apparatus 300A talks, the first mobile phone apparatus 300A receives voice sounds of the first user 420A and scenic sounds. An application executed by the first mobile phone apparatus 300A generates converted sound signals, which include enhanced voice sounds and new scenic sounds according to the received sound signals. Next, the first mobile phone apparatus 300A transmits the converted sound signals to the second mobile phone apparatus 300B via the wireless network 410. Hence, a second user 420B of the second mobile phone apparatus 300B can remotely hear the converted sound signals generated by the first mobile phone apparatus 300A.

During the communication between the first mobile phone apparatus 300A and the second mobile phone apparatus 300B, each cancellation function still works. The acoustic scene conversion and the transmission are concurrently. Delay caused by the acoustic scene conversion and the transmission is less than a threshold value defined by the telecommunication standards which the telephonic system 400 is compliant to. Besides participating an one-on-one telephonic communication, the first mobile phone apparatus 300A may be a party of a multi-parte telephonic conference.

Although the aforementioned acoustic scene conversion is done by the application installed in the mobile phone, it can be also implemented by telephones or computers which connect to the network by cords. Besides, the same function can be implemented by normal feature phones. The embodiments of the present invention can be realized by software, hardware and any combination of software and hardware.

Figure 5:
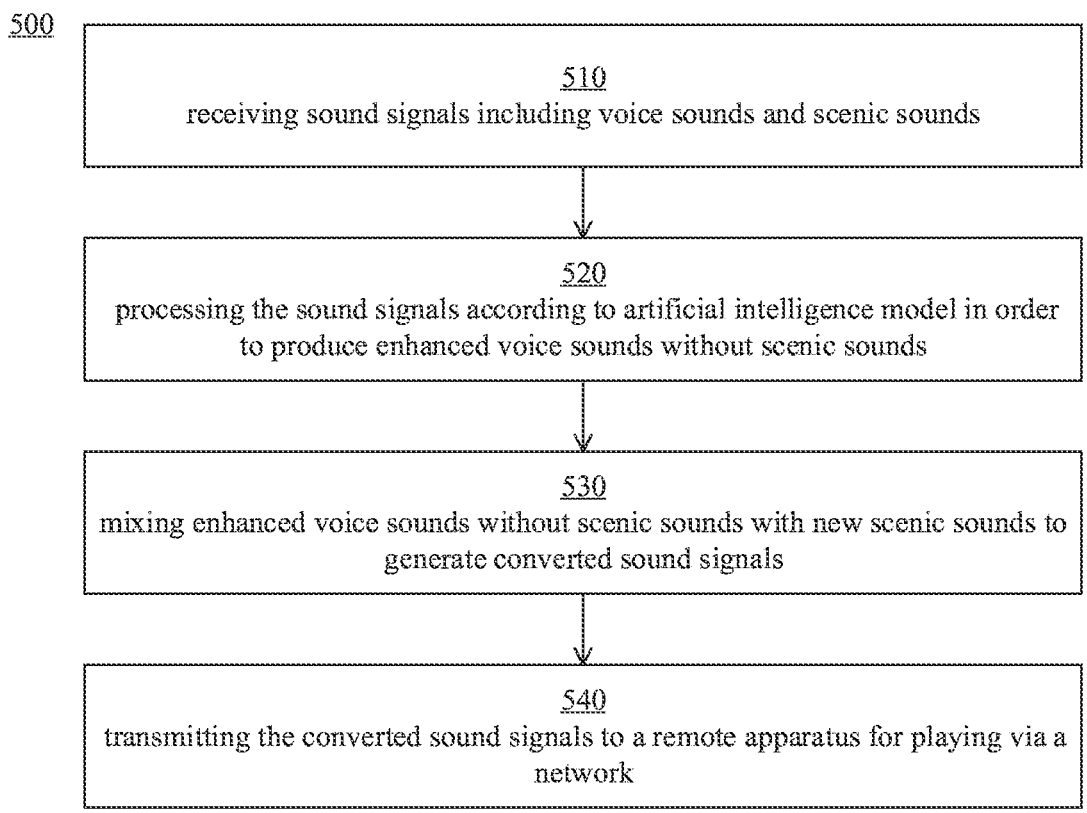
FIG. 5 illustrates a flowchart diagram of an acoustic scene conversion method according to an embodiment of the present invention.

Please refer to FIG. 5, which illustrates a flowchart diagram of an acoustic scene conversion method according to an embodiment of the present invention. The acoustic scene conversion method 500 may be applicable to the mobile phone apparatus 300 as shown in FIG. 3. The acoustic scene conversion method 500 may be implemented by an application executed by the processor unit 350. The application comprises multiple processor instructions stored in non-volatile memory.

Step 510: receiving sound signals including voice sounds and scenic sounds.

Step 520: processing the sound signals according to an AI model in order to generate enhanced voice sounds without scenic sounds.

Step 530: mixing the enhanced voice sounds without scenic sounds with new scenic sounds in order to generate converted sound signals.

Step 540: transmitting the converted sound signals to a remote apparatus for playing via a network in real time.

According to an embodiment of the present invention, an acoustic scene conversion method is provided. The acoustic scene conversion method, comprising: receiving sound signals including user's voice sounds and scenic sounds; processing the sound signals according to an AI model in order to generate enhanced voice sounds without scenic sounds; and mixing the enhanced voice sounds without scenic sounds with new scenic sounds in order to generate converted sound signals.

Preferably, in order to let user in near end or in remote end can hear the converted sound signals, the acoustic scene conversion method further comprises at least one of following steps: transmitting the converted sound signals to a remote apparatus for playing via a network in real time; and playing the converted sound signals.

Preferably, in order to let user in remote end can hear the converted sound signals in real time, a time delay between the receiving and the playing by the remote apparatus is less than a threshold value defined by telephonic voice service standards which the network is compliant to.

Preferably, in order to remove the original scenic sounds more precisely, the acoustic scene conversion method further comprises receiving second sound signals which are concurrently received with the sound signals, wherein where the second sound signals are received is further away from the user's mouth comparing to where the sound signals are received; and modifying the sound signals according to differences between the sound signals and the second sound signals prior to the processing step.

Preferably, in order to remove the original scenic sounds with shorter delay, the AI model is a trained fully convolutional neural network model, the sound signals are inputs of the fully convolutional neural network model.

Preferably, in order to remove the original scenic sounds more precisely, the acoustic scene conversion method further comprises selecting the AI models from multiple candidate AI models according to one or any combination of followings: gender of the user; age of the user; and position of the acoustic scene.

Preferably, in order to automatically remove the original scenic sounds more precisely according to the acoustic scene, the acoustic scene conversion method further comprises receiving positional data of the acoustic scene; and selecting the AI models from multiple candidate AI models according to the positional data of the acoustic scene.

Preferably, in order to remove the original scenic sounds more precisely, the acoustic scene conversion method further comprises removing the scenic sounds from the sound signals according to a first AI model to generate de-noised sound signals; and enhancing voice sounds of the de-noised sound signals according to a second AI model to generate the enhanced voice sounds without scenic sounds.

Preferably, in order to remove the original scenic sounds more precisely, the acoustic scene conversion method further comprises enhancing voice sounds of the sound signals according to a second AI model to generate the enhanced voice sounds; and removing the scenic sounds from the enhanced voice sounds according to a first AI model to generate the enhanced voice sounds without scenic sounds.

According to an embodiment of the present invention, an acoustic scene conversion apparatus is provided. The acoustic scene conversion apparatus, comprising: a microphone, configured for receiving sound signals including user's voice sounds and scenic sounds; and a processor unit, coupled to the microphone, configured to execute multiple instructions stored in non-volatile memory to realize the following steps: processing the sound signals according to an AI model in order to generate enhanced voice sounds without scenic sounds; and mixing the enhanced voice sounds without scenic sounds with new scenic sounds in order to generate converted sound signals.

Preferably, in order to let user in near end or in remote end can hear the converted sound signals, the acoustic scene conversion apparatus further comprises: a network interface connecting to a network; and a speaker, wherein the processor unit is further configured to realize at least one of following: transmitting the converted sound signals to a remote apparatus for playing via the network through the network interface in real time; and having the speaker playing the converted sound signals.

Preferably, in order to let user in remote end can hear the converted sound signals in real time, a time delay between the receiving and the playing by the remote apparatus is less than a threshold value defined by telephonic voice service standards which the network is compliant to.

Preferably, in order to remove the original scenic sounds more precisely, the acoustic scene conversion apparatus further comprises: a second microphone, configured for receiving second sound signals which are concurrently received with the sound signals, wherein the second microphone is further away from the user's mouth comparing to the microphone, wherein the processor unit is further configured to realize modifying the sound signals according to differences between the sound signals and the second sound signals prior to the processing step.

Preferably, in order to remove the original scenic sounds with shorter delay, the AI model is a trained fully convolutional neural network model, the sound signals are inputs of the fully convolutional neural network model.

Preferably, in order to remove the original scenic sounds more precisely, the processor unit is further configured to realize selecting the AI models from multiple candidate AI models according to one or any combination of followings: gender of the user; age of the user; and position of the acoustic scene.

Preferably, in order to automatically remove the original scenic sounds more precisely according to the acoustic scene, the acoustic scene conversion apparatus further comprises: a positioning device for providing positional data of the acoustic scene conversion apparatus, wherein the processor unit is further configured to realize: selecting the AI models from multiple candidate AI models according to the positional data of the acoustic scene.

Preferably, in order to remove the original scenic sounds more precisely, the processing step further comprises: removing the scenic sounds from the sound signals according to a first AI model to generate de-noised sound signals; and enhancing voice sounds of the de-noised sound signals according to a second AI model to generate the enhanced voice sounds without scenic sounds.

Preferably, in order to remove the original scenic sounds more precisely, the processing step further comprises: enhancing voice sounds of the sound signals according to a second AI model to generate the enhanced voice sounds; and removing the scenic sounds from the enhanced voice sounds according to a first AI model to generate the enhanced voice sounds without scenic sounds.

According to an embodiment of the present invention, a telephonic system for acoustic scene conversion is provided. The telephonic system for acoustic scene conversion comprising: a network, and a first apparatus and a second apparatus connecting to the network. The first apparatus further comprising: a first network interface, configured to connect to the network; a microphone, configured for receiving sound signals including user's voice sounds and scenic sounds; and a first processor unit, coupled to the first network interface and the microphone, configured to execute multiple instructions stored in non-volatile memory to realize the following steps: processing the sound signals according to an AI model in order to generate enhanced voice sounds without scenic sounds; mixing the enhanced voice sounds without scenic sounds with new scenic sounds in order to generate converted sound signals; and transmitting the converted sound signals to a remote apparatus for playing via the network through the network interface in real time. The second apparatus comprising: a second network interface, configured to connect to the network; a speaker; and a second processor unit, coupled to the second network interface and the speaker, configured to execute multiple instructions stored in non-volatile memory to realize the following steps: receiving the converted sound signals via the second network interface; and having the speaker for playing the converted sound signals.

Preferably, in order to let user in remote end can hear the converted sound signals in real time, a time delay between the receiving and the playing by the second apparatus is less than a threshold value defined by telephonic voice service standards which the network is compliant to.

The acoustic scene method, apparatus and telephonic system provided by the present invention can prevent actual scenic sounds from propagating to a remote end and can replace it with other scenic sounds while preserving or even enhancing voice sounds.

In addition to telephonic communication, the present invention may be applicable to following scenarios and domains: sound effect engineering of audio/video industry for replacing the original scenic sounds in the recoded motion pictures by other scenic sounds. It is especially suitable for direct broadcast or live broadcast scenarios. Audience can immediately listen to the acoustic scene converted sounds without audio post production. The present invention may also be applicable to amusement systems having augmented reality or virtual reality experience, customer services and hearing aids. In short, the present invention can be applicable to any audio system to improve auditory recognitions and sensings.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An acoustic scene conversion method, comprising:
   receiving sound signals including user's voice sounds and scenic sounds;
   receiving positional data and speed of the user from a positioning device based on satellite positioning system;
   selecting an AI model from multiple candidate AI models according to gender, age, the positional data and the speed of the user, wherein the gender and the age of the user are set up by the user prior to the selecting;
   processing the sound signals according to the AI model in order to generate enhanced voice sounds without scenic sounds;
   mixing the enhanced voice sounds without scenic sounds with new scenic sounds in order to generate converted sound signals;
   transmitting the converted sound signals to a remote apparatus for playing via a network in real time; and
   having the remote apparatus play the converted sound signals.

2. The acoustic scene conversion method as claimed in claim 1, wherein a time delay between the receiving and the playing by the remote apparatus is less than a threshold value defined by telephonic voice service standards which the network is compliant to.

3. The acoustic scene conversion method as claimed in claim 1, further comprises:
   receiving second sound signals which are concurrently received with the sound signals, wherein a second location where the second sound signals are received is farther away from the user's mouth to a first location where the sound signals are received; and
   modifying the sound signals according to differences between the sound signals and the second sound signals prior to the processing step.

4. The acoustic scene conversion method as claimed in claim 1, wherein the AI model is a trained fully convolutional neural network model, the sound signals are inputs of the fully convolutional neural network model.

5. An acoustic scene conversion apparatus, comprising:
   a network interface connecting to a network;
   a positioning device based on satellite positioning system, configured for providing positional data and speed of the acoustic scene conversion apparatus;
   a microphone, configured for receiving sound signals including user's voice sounds and scenic sounds; and
   a processor unit, coupled to the microphone, configured to execute multiple instructions stored in non-volatile memory to realize the following steps:
   selecting an AI model from multiple candidate AI models according to gender and age of a user of the acoustic scene conversion apparatus, the positional data and the speed of the acoustic scene conversion apparatus, wherein the gender and the age of the user are set up by the user prior to the selecting;
   processing the sound signals according to the AI model in order to generate enhanced voice sounds without scenic sounds;
   mixing the enhanced voice sounds without scenic sounds with new scenic sounds in order to generate converted sound signals;
   transmitting the converted sound signals to a remote apparatus for playing via the network through the network interface in real time; and
   having the remote apparatus play the converted sound signals.

6. The acoustic scene conversion apparatus as claimed in claim 5, wherein a time delay between the receiving and the playing by the remote apparatus is less than a threshold value defined by telephonic voice service standards which the network is compliant to.

7. The acoustic scene conversion apparatus as claimed in claim 5, further comprises:
   a second microphone, configured for receiving second sound signals which are concurrently received with the sound signals, wherein the second microphone is farther away from the user's mouth compared to the microphone,
   wherein the processor unit is further configured to realize modifying the sound signals according to differences between the sound signals and the second sound signals prior to the processing step.

8. The acoustic scene conversion apparatus as claimed in claim 5, wherein the AI model is a trained fully convolutional neural network model, the sound signals are inputs of the fully convolutional neural network model.

9. A telephonic system for acoustic scene conversion, comprising:
  a network;
  a first apparatus, further comprising:
    a first network interface, configured to connect to the network;
    a positioning device based on satellite positioning system, configured for providing positional data and speed of the first apparatus;
    a microphone, configured for receiving sound signals including user's voice sounds and scenic sounds; and
    a first processor unit, coupled to the first network interface and the microphone, configured to execute multiple instructions stored in non-volatile memory to realize the following steps:
      selecting an AI model from multiple candidate AI models according to gender and age of a user of the first apparatus, the positional data and the speed of the first apparatus, wherein the gender and the age of the user are set up by the user prior to the selecting;
      processing the sound signals according to an AI model in order to generate enhanced voice sounds without scenic sounds;
      mixing the enhanced voice sounds without scenic sounds with new scenic sounds in order to generate converted sound signals; and
      transmitting the converted sound signals to a remote apparatus for playing via the network through the first network interface in real time; and
  a second apparatus, further comprising:
    a second network interface, configured to connect to the network;
    a speaker; and
    a second processor unit, coupled to the second network interface and the speaker, configured to execute multiple instructions stored in non-volatile memory to realize the following steps:
      receiving the converted sound signals via the second network interface; and
      having the speaker play the converted sound signals.

10. The telephonic system as claimed as claim 9, wherein a time delay between the receiving and the playing by the second apparatus is less than a threshold value defined by telephonic voice service standards which the network is compliant to.

* * * * *